United States Patent
Shiraga

(10) Patent No.: US 9,323,486 B2
(45) Date of Patent: Apr. 26, 2016

(54) NON-TRANSITORY COMPUTER-READABLE STORAGE MEDIUM STORING COMPUTER-READABLE INSTRUCTIONS FOR TERMINAL DEVICE, TERMINAL DEVICE, AND METHOD FOR TERMINAL DEVICE

(71) Applicant: Brother Kogyo Kabushiki Kaisha, Nagoya-shi, Aichi-ken (JP)

(72) Inventor: Naoto Shiraga, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/602,417

(22) Filed: Jan. 22, 2015

(65) Prior Publication Data

US 2015/0205547 A1 Jul. 23, 2015

(30) Foreign Application Priority Data

Jan. 22, 2014 (JP) ................................. 2014-009601

(51) Int. Cl.
G06F 15/00 (2006.01)
G06F 3/12 (2006.01)
G06K 15/00 (2006.01)

(52) U.S. Cl.
CPC ............ *G06F 3/1222* (2013.01); *G06F 3/1238* (2013.01); *G06F 3/1287* (2013.01); *G06F 3/1288* (2013.01); *G06F 3/1292* (2013.01); *G06K 15/4095* (2013.01)

(58) Field of Classification Search
CPC .................................................. G06F 3/1288
USPC ......................................................... 358/1.14
See application file for complete search history.

(56) References Cited

U.S. PATENT DOCUMENTS

| | | | |
|---|---|---|---|
| 8,780,377 B2 | 7/2014 | Nishida et al. | |
| 8,842,320 B2 | 9/2014 | Kitagata | |
| 2007/0283157 A1* | 12/2007 | Yami ..................... | H04L 9/0844 713/175 |
| 2009/0033972 A1* | 2/2009 | Kato ............................ | 358/1.13 |
| 2013/0003106 A1 | 1/2013 | Nishida et al. | |
| 2013/0077125 A1 | 3/2013 | Kitagata | |

FOREIGN PATENT DOCUMENTS

| | | |
|---|---|---|
| JP | 2013-033437 A | 2/2013 |
| JP | 2013-073314 A | 4/2013 |

\* cited by examiner

*Primary Examiner* — Saeid Ebrahimi Dehkordy
(74) *Attorney, Agent, or Firm* — Banner & Witcoff, Ltd.

(57) ABSTRACT

A terminal device may perform receiving a specific key from a print intermediation server. The terminal device may perform sending the received specific key to a print intermediation server in response to the terminal device accepting a print related instruction relating to printing in a printer after the specific key is received. The terminal device may perform receiving an authentication key from the print intermediation server in response to sending the specific key. The terminal device may perform sending a first request to the print intermediation server after a first item of the authentication key is received from the print intermediation server. The terminal device may perform sending a second request to the printer after a second item of the authentication key is received from the print intermediation server.

11 Claims, 7 Drawing Sheets

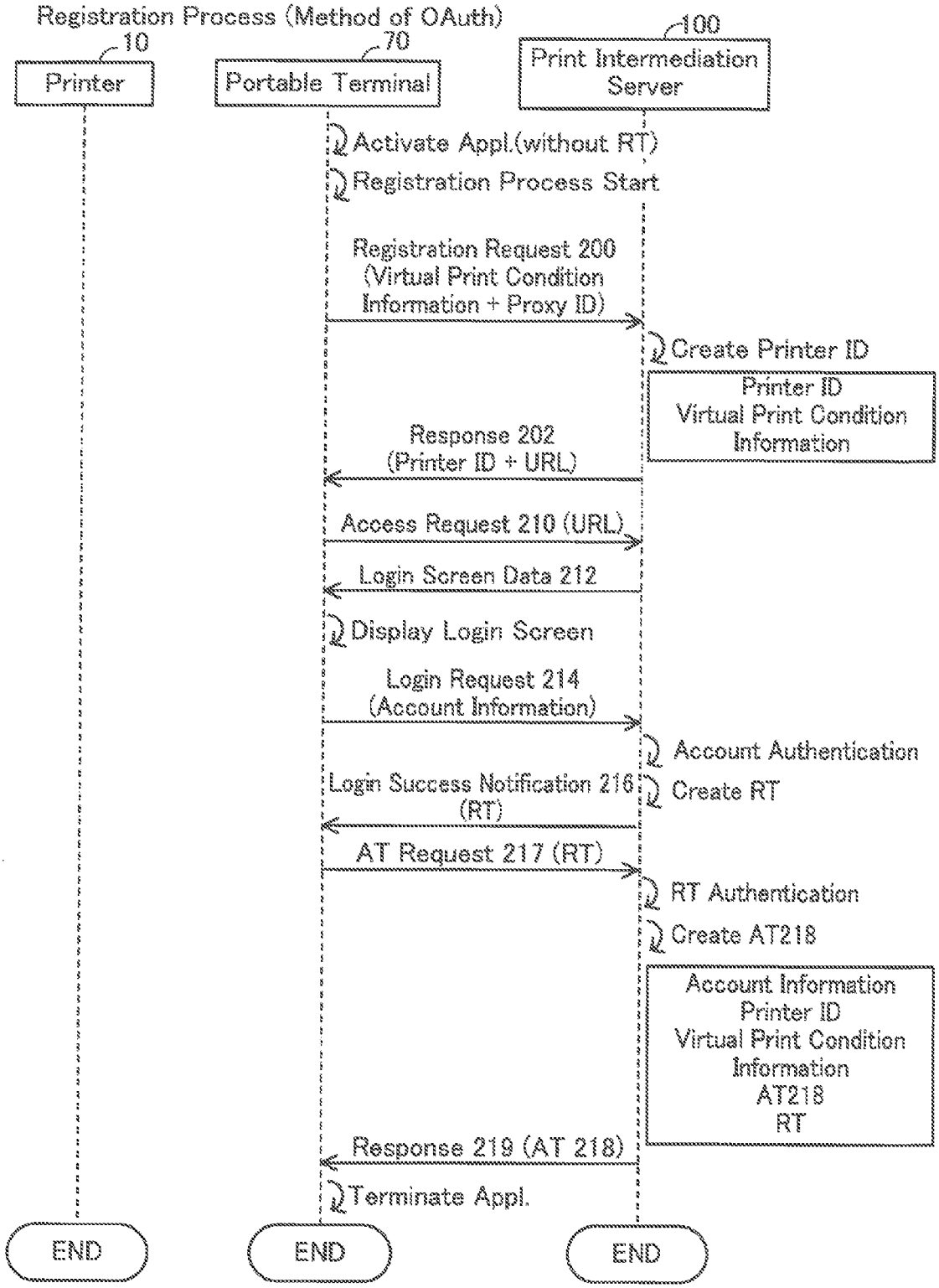

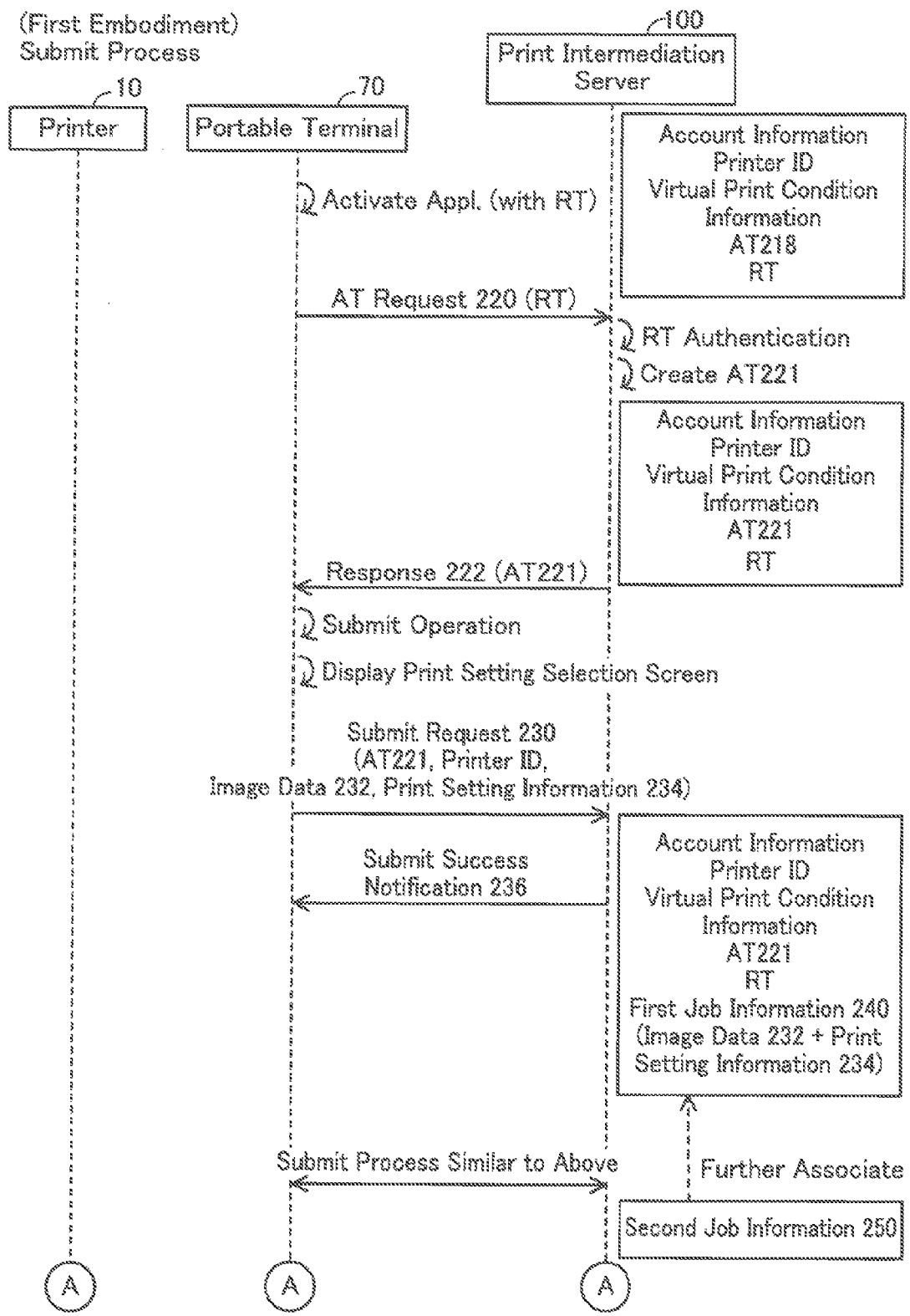

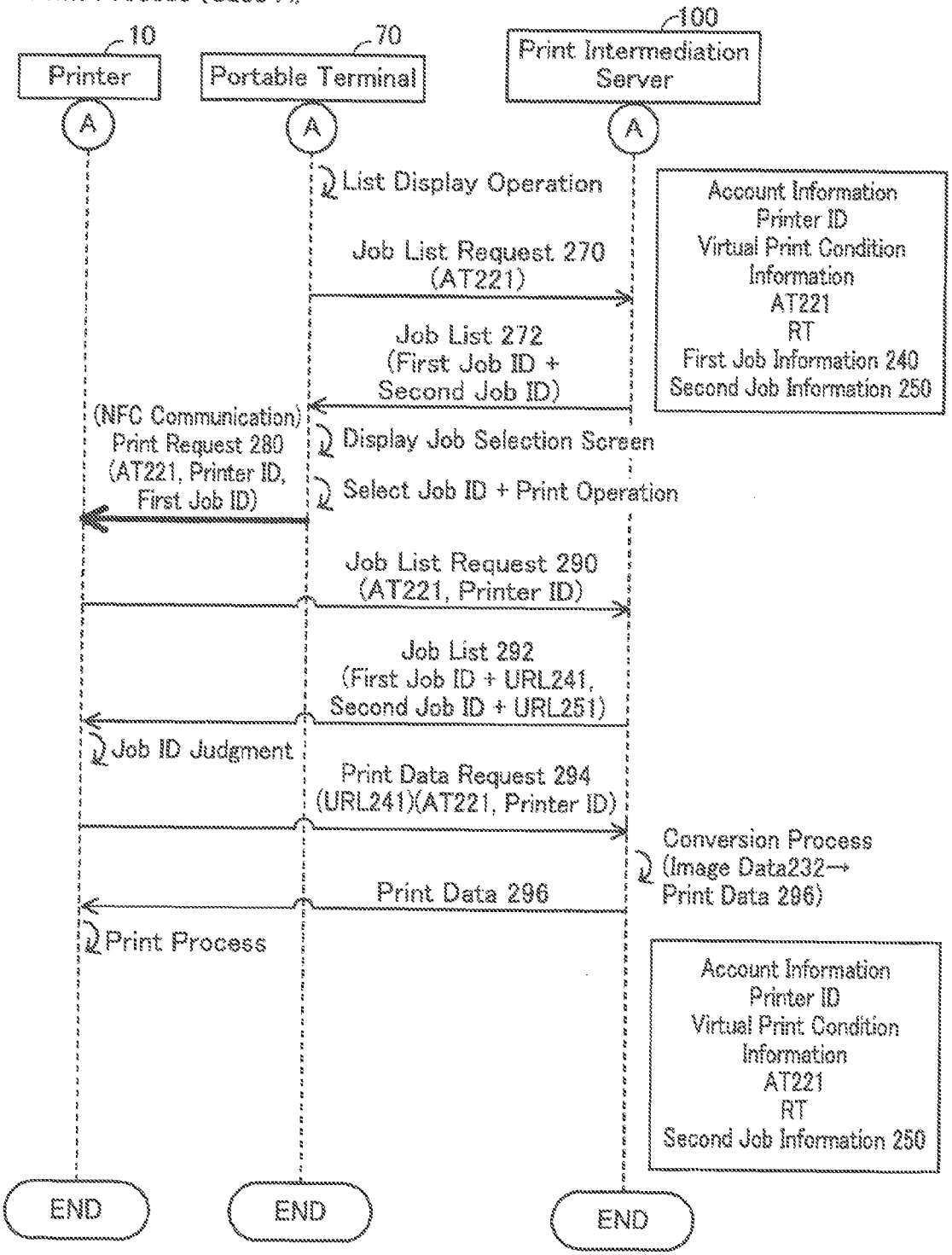

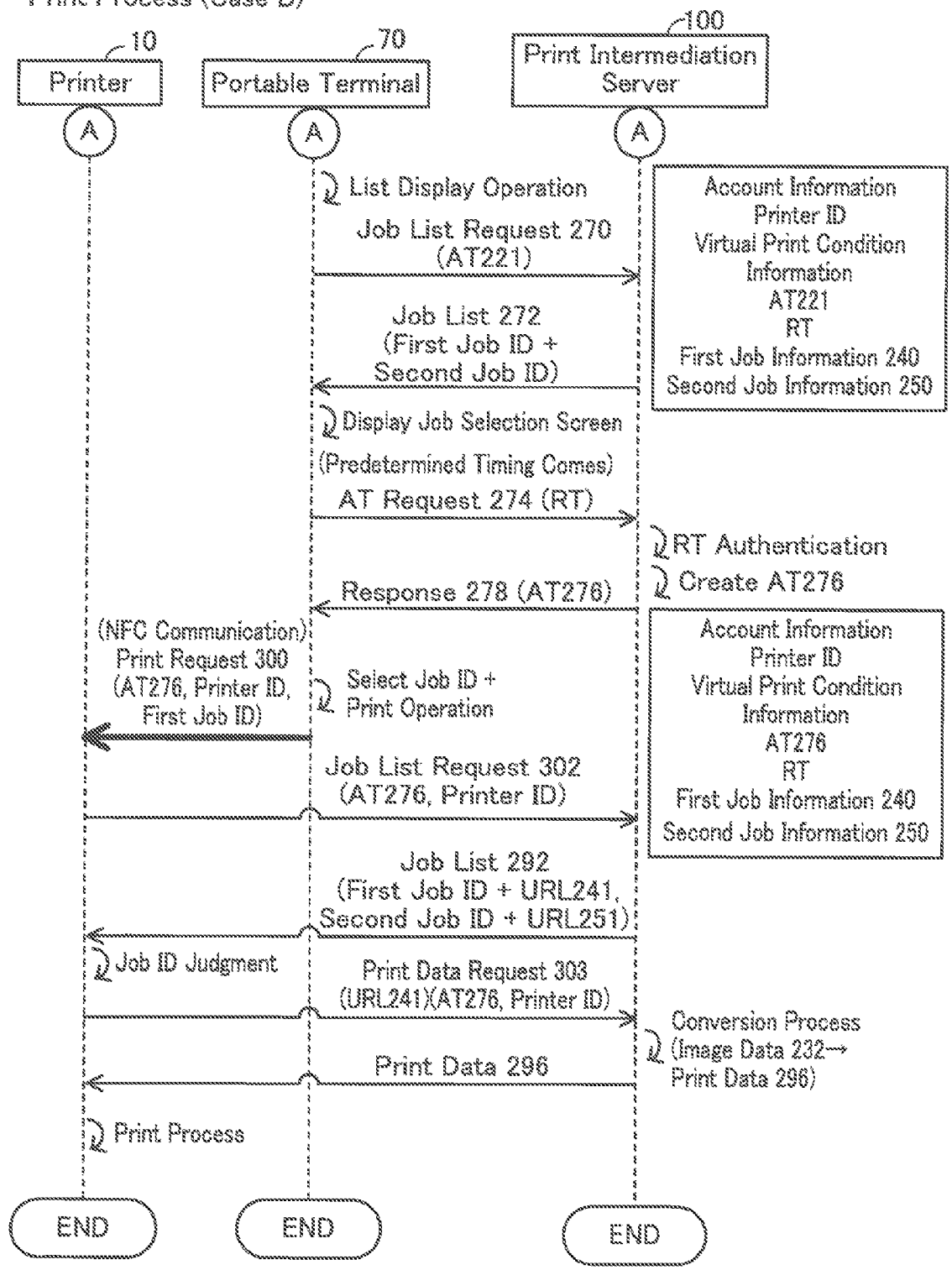

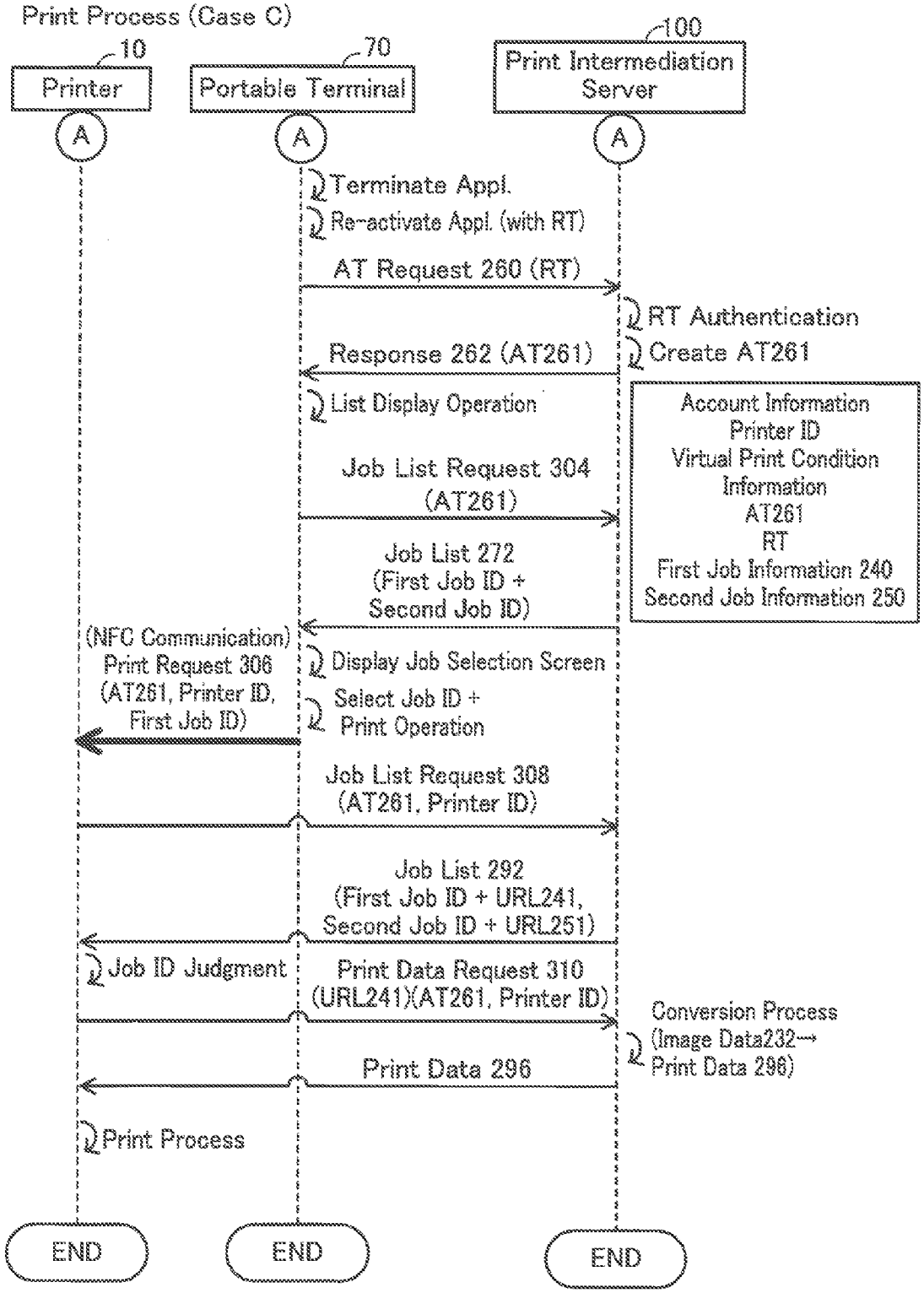

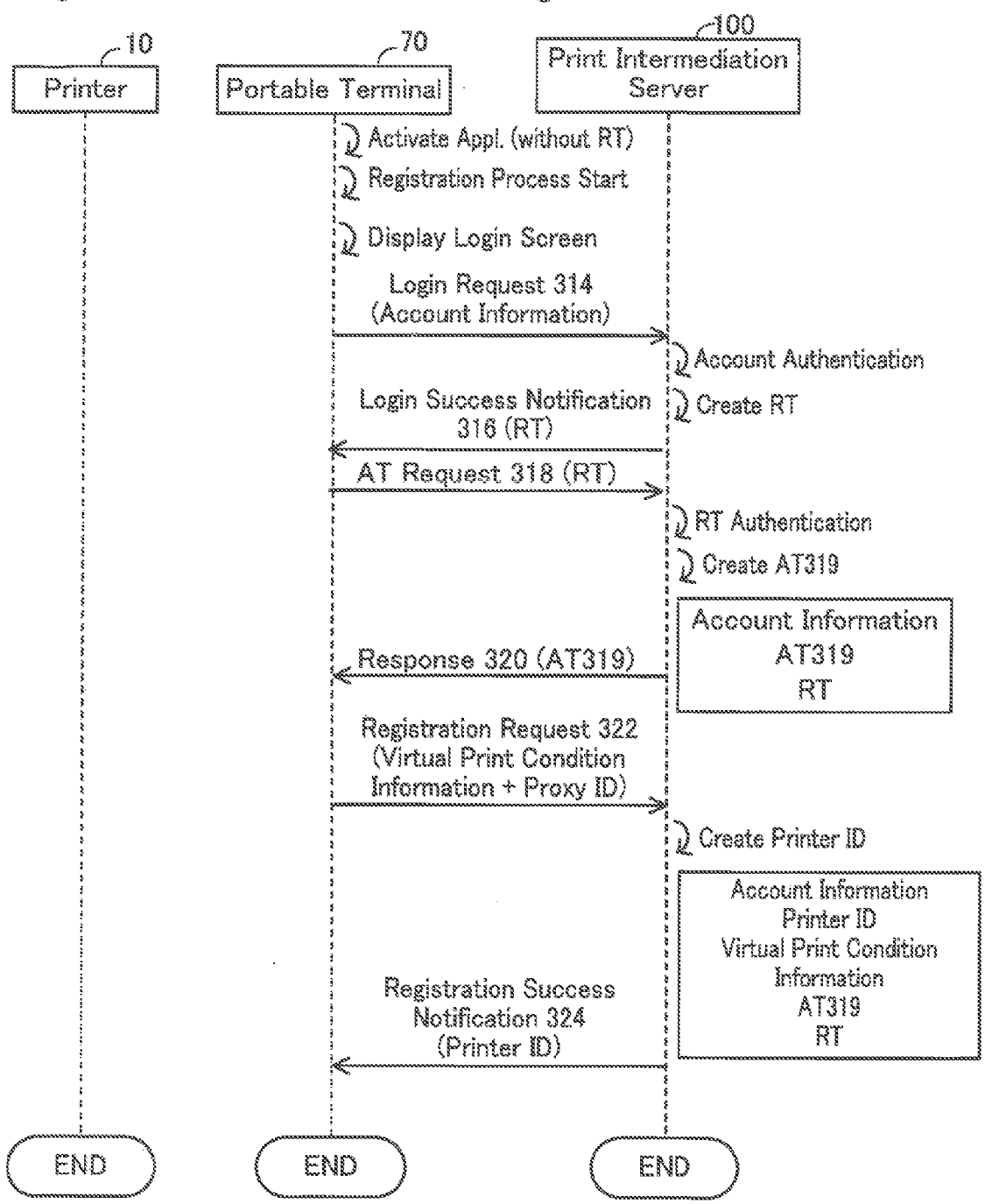

NON-TRANSITORY COMPUTER-READABLE STORAGE MEDIUM STORING COMPUTER-READABLE INSTRUCTIONS FOR TERMINAL DEVICE, TERMINAL DEVICE, AND METHOD FOR TERMINAL DEVICE

CROSS-REFERENCE TO RELATED APPLICATION

This application claims priority to Japanese Patent Application No. 2014-009601, filed on Jan. 22, 2014, the contents of which are hereby incorporated by reference into the present application.

TECHNICAL FIELD

The present specification discloses a technique for allowing a terminal device to cause a printer to perform printing using a print intermediation server.

DESCRIPTION OF RELATED ART

A print controller that manages performing jobs based on an instruction from a client terminal is known. The print controller stores performing jobs based on an instruction from a client terminal. The print controller causes a printer to perform printing according to a performing job. The performing job includes an authentication token used for authentication when supplying print data to a printer. The print controller accesses an authentication server periodically to update an expiration time of the authentication token while the print controller stores the performing job.

SUMMARY

In the technique described above, when a printer performs printing in accordance with an performing job, a remaining expiration time of the authentication token may be not sufficient and printing may not be performed appropriately.

The present specification discloses a technique capable of causing a printer to perform printing appropriately using a print intermediation server.

One technique disclosed in the present application is a non-transitory computer-readable storage medium storing computer-readable instructions for a terminal device. The computer-readable instructions, when executed by a processor mounted on the terminal device, may cause the terminal device to perform receiving a specific key from a print intermediation server, the specific key being for receiving, from the print intermediation server, an authentication key to which an expiration time is set. The computer-readable instructions may cause the terminal device to perform sending the received specific key to the print intermediation server in response to the terminal device accepting a print related instruction relating to printing in a printer after the specific key is received. The computer-readable instructions may cause the terminal device to perform receiving the authentication key from the print intermediation server in response to sending the specific key, the authentication key being created by the print intermediation server each time the print intermediation server receives the specific key from the terminal device, the specific key and the authentication key being associated in the print intermediation server. The computer-readable instructions may cause the terminal device to perform sending a first request to the print intermediation server after a first item of the authentication key is received from the print intermediation server, the first request including the received first item of authentication key and image data related information relating to target image data representing a target image of a print target, the first request being for causing the print intermediation server to associate the image data related information and the specific key which is associated with the first item of authentication key. The computer-readable instructions may cause the terminal device to perform sending a second request to the printer after a second item of the authentication key is received from the print intermediation server, the second request including the received second item of authentication key, the second request being for causing the printer to execute receiving of target print data using the second item of authentication key, the target print data being created from the target image data by the print intermediation server.

BRIEF DESCRIPTION OF DRAWINGS

FIG. 2 illustrates a sequence diagram of a registration process;
FIG. 3 illustrates a sequence diagram of a submit process;
FIG. 4 illustrates a sequence diagram of a print process (Case A);
FIG. 5 illustrates a sequence diagram of a print process (Case B);
FIG. 6 illustrates a sequence diagram of a print process (Case C);
and
FIG. 7 illustrates a sequence diagram of a registration process according to a second embodiment.

DETAILED DESCRIPTION

First Embodiment

Figure 1:
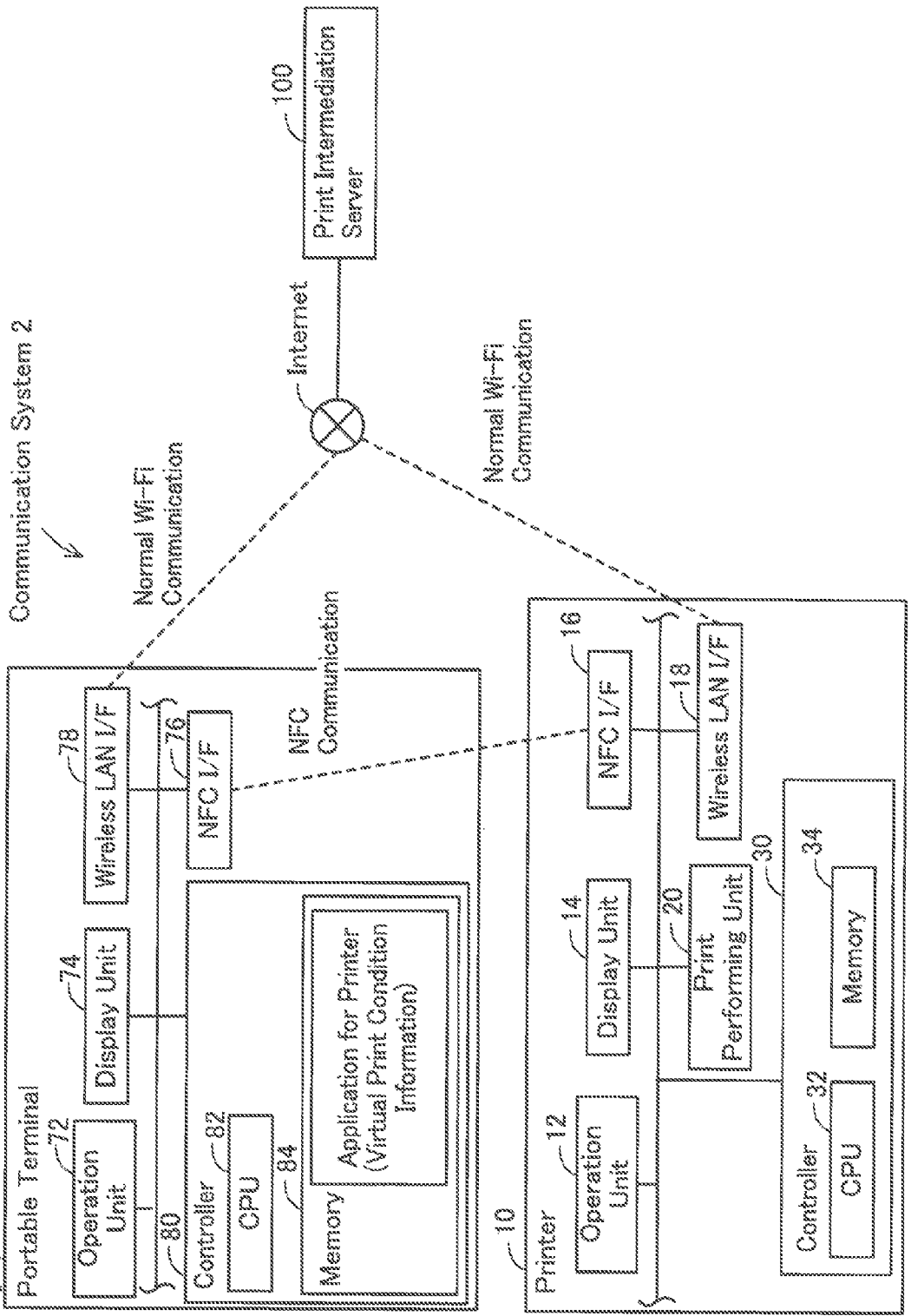
FIG. 1 illustrates a configuration of a communication system.

As shown in FIG. 1, a communication system 2 comprises a printer 10, a portable terminal 70, and a print intermediation server 100. These devices 10, 70, and 100 can communicate with each other via the Internet.

(Configuration of Printer 10)

The printer 10 is a peripheral device (that is, a peripheral device of such as a PC) that can perform a print function. The printer 10 comprises an operation unit 12 and a display unit 14. Moreover, the printer 10 comprises a near field communication (NFC) interface 16. Moreover, the printer 10 comprises a wireless local area network (LAN) interface 18. Moreover, the printer 10 comprises a print performing unit 20. Moreover, the printer 10 comprises a controller 30. These respective units 12 to 30 are connected to a bus line (not denoted by reference numeral). In the following description, the interface will be referred to as an "I/F".

The operation unit 12 comprises a plurality of keys. A user can issue various instructions to the printer 10 by operating the operation unit 12. The display unit 14 is a display for displaying various information. The print performing unit 20 is a printing mechanism which uses an inkjet method, a laser method, and the like.

The NFC I/F 16 is an I/F (that is, an IC chip or a communication circuit) for performing wireless communication (hereinafter referred to as "NFC communication") in accordance with an NFC scheme for so-called near-field wireless communication. The NFC scheme is a wireless communication scheme based on the international standards ISO/IEC 21481 or 18092.

The wireless LAN I/F 18 is an I/F (that is, an IC chip or a communication circuit) for performing wireless communication (hereinafter referred to as "normal Wi-Fi communication") in accordance with a normal Wi-Fi scheme defined by the Wi-Fi Alliance. The normal Wi-Fi scheme is a wireless communication scheme based on the IEEE (The Institute of Electrical and Electronics Engineers, Inc.) 802.11 standards and the standards conforming thereto (for example, 802.11a, 11b, 11g, 11n, and the like).

Here, a difference between the NFC I/F 16 and the wireless LAN I/F 18 will be described. A communication speed (for example, a highest communication speed is 11 to 600 Mbps) of wireless communication via the wireless LAN I/F 18 is faster than a communication speed (for example, a highest communication speed is 100 to 424 Kbps) of wireless communication via the NFC I/F 16. Moreover, the frequency (for example, in the 2.4 GHz or 5.0 GHz frequency bands) of carrier waves in the wireless communication via the wireless LAN I/F 18 is different from the frequency (for example, 13.56 MHz frequency bands) of carrier waves in the wireless communication via the NFC I/F 16. Moreover, for example, when the distance between the NFC I/F 16 of the printer 10 and the NFC I/F of another device (for example, the portable terminal 70) is approximately 10 cm or smaller, the controller 30 can perform NFC communication with the other device via the NFC I/F 16. On the other hand, even when the distance between the wireless LAN I/F 18 of the printer 10 and the wireless LAN I/F of another device (for example, the portable terminal 70) is 10 cm or smaller or 10 cm or larger (for example, approximately 100 m at the largest), the controller 30 can perform normal Wi-Fi communication with the other device via the wireless LAN I/F 18. That is, the largest distance in which the printer 10 can perform wireless communication with another device via the wireless LAN I/F 18 is larger than the largest distance in which the printer 10 can perform wireless communication with another device via the NFC I/F 16.

The controller 30 comprises a CPU 32 and a memory 34. The CPU 32 is a processor that performs various processes in accordance with a program stored in the memory 34. The memory 34 is constructed by a RAM, a ROM, a hard disk, and the like. The memory 34 stores various items of data created or acquired in the course in which the printer 10 performs various processes as well as the program.

(Configuration of Portable Terminal 70)

The portable terminal 70 is a portable terminal device such as a mobile phone (for example, a smartphone), a PDA, a note PC, a tablet PC, a digital camera, a portable music player, or a portable video player. The portable terminal 70 comprises an operation unit 72, a display unit 74, an NFC I/F 76, a wireless LAN I/F 78, and a controller 80. These respective units 72 to 80 are connected by a bus line (not denoted by reference numeral).

The operation unit 72 comprises a plurality of keys. A user can issue various instructions to the portable terminal 70 by operating the operation unit 72. The display unit 74 is a display for displaying various types of information. The NFC I/F 76 and the wireless LAN I/F 78 are the same as the NFC I/F 16 and the wireless LAN I/F 18 of the printer 10, respectively. Thus, the difference between the NFC I/F 76 and the wireless LAN I/F 78 is the same as the difference between the NFC I/F 16 and the wireless LAN I/F 18.

The controller 80 comprises a CPU 82 and a memory 84. The CPU 82 is a processor that performs various processes in accordance with a program stored in the memory 84. The memory 84 is consisted by a RAM, a ROM, a hard disk, and the like. The memory 84 stores various items of data created or acquired in the course in which the portable terminal 70 performs various processes as well as the program.

The memory 84 further stores an application for printer (hereinafter referred to as a "printer application"; and further, it may be denoted as "Appl." in this description and drawings) for causing the printer 10 to perform printing using the print intermediation server 100. The printer application is an application provided by the vendor of the printer 10. The printer application may be installed in the portable terminal 70 from a server on the Internet and may be installed in the portable terminal 70 from a medium shipped together with the printer 10.

(Configuration of Print Intermediation Server 100)

The print intermediation server 100 is a server provided on the Internet and is a GCP server provided by Google (registered trademark). In a modification, the print intermediation server 100 may be a server provided by the vendor of the printer 10 and may be a server provided by a service provider different from the vendor of the printer 10, for example.

The print intermediation server 100 is a server for performing intermediation of printing between an external device (for example, the portable terminal 70) and a printer (for example, the printer 10). That is, the print intermediation server 100 converts image data submitted from an external device, creates print data having a data format that the printer can interpret, and provides the print data to the printer. Thus, the external device can cause the printer to perform printing just by submitting image data to the print intermediation server 100 even when the external device does not have a printer driver for converting image data to print data.

(Advance Preparations)

As described above, for example, the portable terminal 70 can cause the printer 10 to perform printing via the print intermediation server 100. Hereinafter, various processes for the printing will be described with reference to FIGS. 2 to 6. The user of the portable terminal 70 needs to perform the following preparations in order to realize operations of the portable terminal 70 disclosed in FIGS. 2 to 6.

That is, the user needs to register account information in the print intermediation server 100 using the portable terminal 70, for example. The account information includes a user ID, a password, and the like, for example. The user may register the account information in the print intermediation server 100 using another device (for example, a PC or the like) instead of using the portable terminal 70. When the account information of the user is registered in the print intermediation server 100, the user can cause the printer 10 to perform printing via the print intermediation server 100 using the portable terminal 70.

(Registration Process: FIG. 2)

Next, by referring to FIG. 2, a registration process in which the portable terminal 70 registers necessary information in the print intermediation server 100 will be described. In the present embodiment, a registration process which uses OAuth is performed. In a second embodiment described later, a registration process which uses a Client Login is performed (see FIG. 7).

In the registration process, the user of the portable terminal 70 may not be present near the printer 10. That is, for example, in a situation where the printer 10 is placed in a home and the user is outside while carrying the portable terminal 70, the user can register various items of information in the print intermediation server 100 using the portable terminal 70.

In the registration process of FIG. 2, it is assumed that a printer application installed in the portable terminal 70 is activated for the first time. Thus, at this timing, a refresh token (RT) and an authentication (or access) token (AT) which will be described later are not stored in the memory 84. The user of the portable terminal 70 activates the printer application installed in the portable terminal 70. In this case, the CPU 82 starts the registration process shown in FIG. 2 in accordance with the printer application.

First, the CPU 82 reads virtual print condition information registered in advance in the printer application from the memory 84. The virtual print condition information is information that indicates virtual print conditions that a virtual printer rather than a real printer (for example, the printer 10) can use and is information that is determined in advance by the vendor of the printer 10. As shown in FIG. 1, the virtual print condition information is registered in advance in the printer application. Thus, the virtual print condition information is stored in advance in the memory 84 without being acquired from the real printer (for example, the printer 10).

The virtual print conditions include the size (that is, a sheet size) of a print sheet on which an image is to be printed, information on whether duplex printing is to be performed, and the number of colors (for example, monochrome printing, color printing, and the like), for example. In the present embodiment, the predetermined virtual print conditions include "A4" and "B5" as the sheet size, "No" as the information on whether duplex printing is to be performed, and "Monochrome" and "Color" as the number of colors. The virtual print conditions may further include other conditions such as a print direction (for example, landscape printing, portrait printing, and the like).

Subsequently, the CPU 82 reads a proxy ID (that is, an ID for identifying the portable terminal 70) of the portable terminal 70 from the memory 84. The CPU 82 sends a registration request 200 including the virtual print condition information and the proxy ID to the print intermediation server 100 via the wireless LAN I/F 78 (that is, via the Internet). The URL (the URL of a destination of the registration request 200) of the print intermediation server 100 is registered in advance in the printer application. In the following description, the URL of a destination of a request may be the URL that is registered in advance in the printer application unless stated in particular. However, the URL of the destination of the request may be a URL acquired from the print intermediation server 100 before the request is sent.

Upon receiving the registration request 200 from the portable terminal 70, the print intermediation server 100 creates a printer ID for identifying a registration target printer using the proxy ID included in the registration request 200. Since the portable terminal 70 does not designate a real printer (for example, the printer 10) as the registration target printer (that is, the registration request 200 does not include the print condition information of the real printer, the proxy ID of the real printer, and the like), the printer ID created by the print intermediation server 100 is an ID for identifying a virtual printer.

The print intermediation server 100 stores the printer ID of a created virtual printer and the virtual print condition information included in the registration request 200 in association. In FIG. 2, the boxes on the right side of a broken line corresponding to the print intermediation server 100 illustrate a state where respective items of information in the box are associated with each other. The same is applied to FIG. 3 and the subsequent diagrams.

Subsequently, the print intermediation server 100 sends a response 202 including the created printer ID and a login URL indicating the location of login screen data 212 (described later) to the portable terminal 70.

Upon receiving the response 202 from the print intermediation server 100 via the wireless LAN I/F 78, the CPU 82 stores the printer ID included in the response 202 in the memory 84. Subsequently, the CPU 82 sends an access request 210 to the print intermediation server 100 via the wireless LAN I/F 78 using the login URL included in the response 202 as a destination.

Upon receiving the access request 210 from the portable terminal 70, the print intermediation server 100 sends the login screen data 212 to the portable terminal 70. The login screen data 212 is data that indicates a login screen for inputting account information (that is, a user ID, a password, and the like).

Upon receiving the login screen data 212 from the print intermediation server 100 via the wireless LAN I/F 78, the CPU 82 displays a login screen represented by the login screen data 212 on the display unit 74. The user input the account information registered in the print intermediation server 100 during the preparation to the portable terminal 70 using the operation unit 72. In this case, the CPU 82 sends a login request 214 including the input account information to the print intermediation server 100 via the wireless LAN I/F 78.

In the above example, a case where the account information is input to the portable terminal 70 by the user has been described. In a modification, for example, when the preparation was performed using the portable terminal 70, the memory 84 may store the account information. In this case, the CPU 82 may read the account information from the memory 84 and send the login request 214 including the account information to the print intermediation server 100 without causing the user to input the account information.

Upon receiving the login request 214 from the portable terminal 70, the print intermediation server 100 executes authentication of the account information included in the login request 214. Specifically, the print intermediation server 100 determines whether the account information included in the login request 214 has been registered in the print intermediation server 100. When it is determined that the account information has not been registered (that is, authentication of the account information fails), the print intermediation server 100 sends a login error notification to the portable terminal 70, which is not shown in the diagram. In this case, the registration process ends without the subsequent process being executed.

On the other hand, when it is determined that the account information has been registered (that is, authentication of the account information is successful), the print intermediation server 100 creates a token which is a unique character string. The token is information for performing authentication used in the subsequent processes (for example, the print process of FIGS. 4 to 6). In the following description, the token created here will be referred to as "a refresh token (RT)". In the present embodiment, an expiration time is not set to the RT. The RT can be said to be a key for receiving a token (hereinafter referred to as an "authentication (or access) token (AT)"), to which the expiration time is set, from the print intermediation server 100.

Subsequently, the print intermediation server 100 stores the successfully authenticated account information, the printer ID of the virtual printer, the virtual print condition information, and the created RT in association. The print intermediation server 100 sends a login success notification 216 that includes the created RT to the portable terminal 70.

Upon receiving the login success notification 216 from the print intermediation server 100 via the wireless LAN I/F 78, the CPU 82 stores the RT included in the login success notification 216 in the memory 84. Subsequently, the CPU 82 sends an AT request 217 including the RT that has been stored in the memory 84 to the print intermediation server 100 via the wireless LAN I/F 78.

Upon receiving the AT request 217 from the portable terminal 70, the print intermediation server 100 executes authentication of the RT included in the AT request 217. Specifically, the print intermediation server 100 determines whether the RT included in the AT request 217 is stored in the print intermediation server 100.

When it is determined that the RT is stored (that is, the RT authentication is successful), the print intermediation server 100 creates a token (that is, an AT) different from the RT. The AT includes information that indicates the time at which the AT was created and an expiration time of the AT. In the present embodiment, the expiration time of the AT is set to 30 minutes from the time of creation. In another example, the expiration time of the AT is not limited to 30 minutes from the time of creation but may be set to an optional period. In the following description, the AT created here will be referred to as an AT 218.

Subsequently, the print intermediation server 100 stores the created AT 218 in association with the successfully authenticated RT. As a result, in the print intermediation server 100, the successfully authenticated RT, the account information, the printer ID, the virtual print condition information, and the AT 218 are associated. The print intermediation server 100 sends a response 219 including the created AT 218 to the portable terminal 70.

Upon receiving the response 219 from the print intermediation server 100 via the wireless LAN I/F 78, the CPU 82 stores the AT 218 included in the response 219 in the memory 84.

In the present embodiment, after that, the user of the portable terminal 70 performs an operation of terminating the printer application. In accordance with this, the CPU 82 terminates the printer application. As a result, the registration process ends.

(Submit Process: FIG. 3)

Next, by referring to FIG. 3, a submit process for allowing the portable terminal 70 to submit image data indicating a print target image to the print intermediation server 100 will be described. In the submit process, the user of the portable terminal 70 may not be present near the printer 10 similarly to the registration process. For example, the user outside home can submit image data indicating an image captured by the portable terminal 70 to the print intermediation server 100.

When the user of the portable terminal 70 wants to submit image data to the print intermediation server 100, the user activates the printer application first. At this timing, the RT (see FIG. 2) received from the print intermediation server 100 in the registration process is stored in the memory 84. Due to this, when the printer application is activated, the CPU 82 sends an AT request 220 including the RT to the print intermediation server 100 via the wireless LAN I/F 78.

Upon receiving the AT request 220 from the portable terminal 70, the print intermediation server 100 executes authentication of the RT included in the AT request 220. A method of authenticating the RT is the same as that described above. When the authentication of the RT is successful, the print intermediation server 100 creates an AT 221 which is a token different from the AT 218 associated with the RT that has been authenticated successfully. Subsequently, the print intermediation server 100 stores the successfully authenticated RT and the created AT 221 in association with each other. In this case, the print intermediation server 100 stores the created AT 221 instead of the AT 218 that has been stored in association with the RT. As a result, in the print intermediation server 100, the successfully authenticated RT, the account information, the printer ID, the virtual print condition information, and the created AT 221 are associated. The print intermediation server 100 sends a response 222 including the created AT 221 to the portable terminal 70. As described above, according to the present embodiment, the portable terminal 70 can receive the AT 221 from the print intermediation server 100 by activating the printer application.

As described above, at the point in time when the submit process starts, the RT is already stored in the memory 84. Due to this, when the printer application is activated, the CPU 82 sends the AT request 220 including the RT to the print intermediation server 100 instead of sending a login request including the account information to the print intermediation server 100. Moreover, the print intermediation server 100 performs RT authentication instead of account authentication.

Upon receiving the response 222 from the print intermediation server 100 via the wireless LAN I/F 78, the CPU 82 stores the AT 221 included in the response 222 in the memory 84.

Subsequently, the user of the portable terminal 70 performs a submit operation. Specifically, the user of the portable terminal 70 selects a button indicating "Submit" on the screen displayed in accordance with the printer application. Further, the user designates image data stored in the memory 84. The image data may be data of an optional format as long as the data indicates a print target image. For example, the image data may be bitmap data of a joint photographic experts group (JPEG) format, vector data, text data, or data of other formats.

When the submit operation is performed, the CPU 82 displays a print setting selection screen on the display unit 74. Specifically, the CPU 82 reads the virtual print condition information registered in advance in the printer application from the memory 84 and displays a print setting selection screen for allowing the user to select print setting for printing an image among the virtual print conditions indicated by the virtual print condition information on the display unit 74. In another embodiment, the CPU 82 may send a request for the virtual print condition information to the print intermediation server 100 and acquire the virtual print condition information from the print intermediation server 100.

As described above, the virtual print conditions include "A4" and "B5" as the sheet size, "No" as the information on whether duplex printing is to be performed, and "Monochrome" and "Color" as the number of colors. Thus, the print setting selection screen has such an aspect that "A4" or "B5" can be selected as the sheet size and "Monochrome" or "Color" can be selected as the number of colors.

The user, refereeing to the print setting selection screen, selects print setting by selecting the sheet size (for example, "A4") and the number of colors (for example, "Color") using the operation unit 72. Since there is no option for the information (that is, "No") on whether duplex printing is to be performed, duplex printing (that is, "No") is automatically included in the print setting.

In the print intermediation server 100, print data is created in accordance with the selected print setting and the print data is provided to the printer 10 (see FIG. 4), which will be described in detail later. As described above, the selected print setting is selected among the virtual print conditions and is not selected from the print conditions that the printer 10 can actually use. That is, it is not guaranteed that the printer 10 can perform printing in accordance with the selected print setting. However, in the present embodiment, the vendor of the printer 10 determines print conditions that a normal printer (for example, all printers sold by the vendor) can use in advance as the virtual print conditions and provides a printer application including virtual print condition information that indicates the virtual print conditions. Thus, in the present embodiment, the printer 10 can perform printing appropriately in accordance with the selected print setting.

When the print setting is selected by the user, the CPU 82 sends a submit request 230 including the received AT 221, the printer ID of the virtual printer in the memory 84, image data 232 designated by the user, print setting information 234 indicating the print setting designated by the user to the print intermediation server 100 via the wireless LAN I/F 78.

Upon receiving the submit request 230 from the portable terminal 70, the print intermediation server 100 executes authentication of the AT 221 included in the submit request 230. When it is determined that the AT 221 is stored (that is, the authentication of the AT 221 is successful), the print intermediation server 100 stores respective items of information included in the submit request 230 in association. As a result, in the print intermediation server 100, respective items of information (that is, the account information, the printer ID, the virtual print condition information, the RT, and the AT 221) stored when the AT 221 is created are associated with first job information 240 (that is, the image data 232 and the print setting information 234). Then, the print intermediation server 100 sends a submit success notification 236 to the portable terminal 70.

The CPU 82 receives the submit success notification 236 from the print intermediation server 100 via the wireless LAN I/F 78. In accordance with this, a submit process for submitting one job information 240 ends. When the user wants to submit another image data to the print intermediation server 100, the user performs the same operation as above. By doing so, the CPU 82 can submit second job information 250 to the print intermediation server 100 by executing the same process as above. As a result, in the print intermediation server 100, two items of job information (that is, first and second items of job information 240 and 250) are stored in association with the account information, the printer ID, and the like.

(Print Process: FIGS. 4 to 6)

Next, by referring to FIGS. 4 to 6, a print process for allowing the portable terminal 70 to cause the printer 10 to perform printing in accordance with the first job information 240 will be described. In the print process, the user of the portable terminal 70 has to be present near the printer 10. This is because the portable terminal 70 and the printer 10 have to perform NFC communication as will be described later. Thus, the user causes the printer 10 to perform printing using the portable terminal 70 after coming home from the outside, for example. Hereinafter, by referring to FIGS. 4 to 6, the details of the print process in respective cases A, B, and C will be described. The print processes of Cases A, B, and C are performed under a situation where the printer application is activated continuously without being terminated after the submit process shown in FIG. 3 is performed.

(Case A: FIG. 4)

As shown in FIG. 4, in Case A, after the submit process of FIG. 3 ends, the user of the portable terminal 70 performs a list display operation. Specifically, the user of the portable terminal 70 selects a button indicating "List Display" on a screen displayed in accordance with the printer application.

When the list display operation is performed, the CPU 82 sends a job list request 270 including the AT 221 to the print intermediation server 100 via the wireless LAN I/F 78.

Upon receiving the job list request 270 from the portable terminal 70, the print intermediation server 100 executes authentication of the AT 221 included in the job list request 270. When it is determined that the AT 221 has been registered (that is, the authentication is successful), the print intermediation server 100 sends a job list 272 including a first job ID and a second job ID for identifying the first job information 240 and the second job information 250, respectively, associated with the AT 221 to the portable terminal 70.

The CPU 82 receives the job list request 270 from the print intermediation server 100 via the wireless LAN I/F 78. Upon receiving the job list request 270, the CPU 82 displays a job selection screen on the display unit 74 using the respective job IDs included in the job list 272. The job selection screen includes the first job ID and the second job ID.

The user of the portable terminal 70 operates the operation unit 72 to select one or more job IDs. Further, the user performs a print operation in a state where one or more job IDs are selected. That is, the user selects a button indicating "Print" on a screen displayed in accordance with the printer application. In the following description, a case where the first job ID for identifying the first job information 240 is selected by the user and the print operation is performed will be described as an example.

When the first job ID is selected and the print operation is performed, the CPU 82 displays a message for urging the user to carry the portable terminal 70 close to the printer 10 on the display unit 74. The CPU 82 encrypts the AT 221, the printer ID, the selected first job ID using an encryption key registered in advance in the printer application to thereby create encrypted data. An encryption method is not particularly limited, and an advanced encryption standard (AES) algorithm, a data encryption standard (DES) algorithm, and the like may be used, for example.

The user of the portable terminal 70 carries the portable terminal 70 close to the printer 10. When the distance between the NFC I/F 76 of the portable terminal 70 and the NFC I/F 16 of the printer 10 is a predetermined distance (for example, 10 cm) or smaller, the CPU 82 sends via the NFC I/F 76 a print request 280 including the encrypted data (that is, the encrypted data of the AT 221, the printer ID, and the first job ID) to the printer 10. In this example, since NFC communication is performed, the CPU 82 can send a print instruction and encrypted data to the printer 10 without using an IP address of a destination, a URL of a destination, or the like. Moreover, since the AT 221, the printer ID, and the first job ID are encrypted, it is possible to suppress these items of information from being acquired by a third party unjustly.

Upon receiving the print request 280 from the portable terminal 70 via the NFC I/F 16, the CPU 32 decrypts the encrypted data using an encryption key (that is, an encryption key identical to the encryption key used by the portable terminal 70) stored in advance in the memory 34. As a result, the CPU 32 can acquire the AT 221, the printer ID, and the first job ID.

Subsequently, the CPU 32 sends a job list request 290 including the acquired AT 221 and printer ID to the print intermediation server 100 stored in advance in the memory 34 via the wireless LAN I/F 18 (that is, via the Internet) using the URL of the print intermediation server 100 as a destination.

Upon receiving the job list request 290 from the printer 10, the print intermediation server 100 executes authentication of the AT 221 and the printer ID included in the job list request 290. When it is determined that the AT 221 and the printer ID are stored (that is, the authentication of the AT 221 and the printer ID is successful), the print intermediation server 100 creates a job list 292 including a combination of the first job ID for identifying the first job information 240 associated with these items of information and a URL 241 indicating the location of print data 296 described later (that is, print data corresponding to the first job information 240) and a combination of the second job ID for identifying the second job information 250 and a URL 251 indicating the location of print data corresponding to the second job information 250. The print intermediation server 100 sends the job list 292 to the printer 10.

Upon receiving the job list 292 from the print intermediation server 100 via the wireless LAN I/F 18, the CPU 32 makes determination on the job ID. Specifically, the CPU 32 determines whether the first job ID included in the print request 280 received from the portable terminal 70 is included in the job list 292 received from the print intermediation server 100. When it is determined that the first job ID included in the print request 280 received from the portable terminal 70 is included in the job list 292 received from the print intermediation server 100, the CPU 32 sends a print data request 294 via the wireless LAN I/F 18 using the URL 241 corresponding to the first job ID as a destination. The print data request 294 includes information indicating a data format that the printer 10 can interpret, the AT 221, the printer ID. The data format is a portable document format (PDF), for example.

Upon receiving the print data request 294 from the printer 10, the print intermediation server 100 executes authentication of the AT 221 and the printer ID included in the print data request 294 similarly to that described above. When it is determined that the AT 221 and the printer ID are stored (that is, authentication of the AT 221 and the printer ID is successful), the print intermediation server 100 performs a conversion process. That is, the print intermediation server 100 converts the image data 232 included in the first job information 240 in accordance with the print setting information 234 included in the first job information 240 and information indicating the data format included in the print data request 294 to create the print data 296. For example, when the print setting information 234 includes "XPS" as the data format, "A4" as the sheet size, "No" as the information on whether duplex printing is to be performed, and "Color" as the number of colors, the print intermediation server 100 creates the print data 296 for performing printing a color image on single side of an A4-size print sheet. Moreover, when the print data request 294 includes information indicating a PDF format, the print intermediation server 100 creates the print data 296 having the PDF format.

Subsequently, the print intermediation server 100 stores the created print data 296 at a location corresponding to the URL 241 included in the job list 292. The print intermediation server 100 sends the print data 296 stored in the location corresponding to the URL 241 which is a destination of the print data request 294 to the printer 10. The print intermediation server 100 deletes the first job information 240 among the two items of job information (that is, the first and second items of job information 240 and 250) stored in association with the AT 221 and the like from the memory.

The CPU 32 receives the print data 296 from the print intermediation server 100 via the wireless LAN I/F 18. The CPU 32 provides the received print data 296 to the print performing unit 20. As a result, the CPU 32 prints an image represented by the print data 296 on a print sheet. Thus, the user of the portable terminal 70 can acquire the printed print sheet.

(Case B: FIG. 5)

Next, Case B will be described. Although the basic process flow of Case B is the same as that of Case A, Case B is different from Case A in that the AT 221 is updated to an AT 276 when a predetermined timing arrives before the user of the portable terminal 70 selects a job ID and performs a print operation after the job selection screen is displayed.

As shown in FIG. 5, in Case B, after the submit process of FIG. 3 ends, the user of the portable terminal 70 performs a list display operation.

When the list display operation is performed, the CPU 82 sends a job list request 270 including the AT 221 to the print intermediation server 100 via the wireless LAN I/F 78. After that, the job list 272 is sent and the job selection screen is displayed similarly to Case A.

In Case B, a predetermined timing arrives before the user of the portable terminal 70 selects a job ID and performs a print operation after the job selection screen is displayed. The predetermined timing is a timing at which 15 minutes has elapsed from the creation time of the AT 221 (that is, a timing at which the remaining expiration time of the AT 221 is half the expiration time or smaller). In another embodiment, the predetermined timing may be an optional timing as long as the timing occurs before the expiration time of the AT 221 arrives.

The CPU 82 monitors the arrival of the predetermined timing from the creation time of the AT 221 included in the received AT 221. When the arrival of the predetermined timing is detected, the CPU 82 sends an AT request 274 including the RT stored in the memory 84 to the print intermediation server 100 via the wireless LAN I/F 78.

Upon receiving the AT request 274 from the portable terminal 70, the print intermediation server 100 executes authentication of the RT included in the AT request 274. When the authentication of the RT is successful, the print intermediation server 100 creates an AT 276 which is a token different from the AT 221 associated with the successfully authenticated RT. Subsequently, the print intermediation server 100 stores the successfully authenticated RT, the created AT 276, and the respective items of information (that is, the account information, the printer ID, the virtual print condition information, the first job information 240, and the second job information 250) associated with the RT in association. In this case, the print intermediation server 100 stores the created AT 276 instead of the stored AT 221. The print intermediation server 100 sends a response 278 including the created AT 276 to the portable terminal 70.

Upon receiving the response 278 from the print intermediation server 100 via the wireless LAN I/F 78, the CPU 82 stores the AT 276 included in the response 278 in the memory 84. In this case, the CPU 82 stores the AT 276 included in the response 278 in the memory 84 instead of the AT 221 stored in the memory 84.

After that, the user of the portable terminal 70 selects the first job ID and performs a print operation. The processes performed by the CPU 82, the CPU 32, and the print intermediation server 100 are the same as those of Case A except that the AT 276 is used instead of the AT 221. Specifically, the difference from Case A is that the print request 300 that the CPU 82 sends to the printer 10 and the job list request 302 and the print data request 303 that the CPU 32 sends to the print intermediation server 100 include the AT 276. Thus, detailed description of these processes will not be provided.

As described above, in Case B, when the predetermined timing arrives, the portable terminal 70 sends the RT to the print intermediation server 100 and receives the AT 276 that is different from the AT 221 from the print intermediation server 100. The portable terminal 70 sends the print request 300 that includes the AT 276 different from the AT 221 to the printer 10. Thus, the portable terminal 70 can send the print request 300 appropriately to the printer 10 before the remaining expiration time of the AT 276 becomes insufficient.

(Case C: FIG. 6)

Next, Case C will be described. Although the basic process flow of Case C is the same as that of Case A, Case C is different from Case A in that the printer application is terminated once after the submit process of FIG. 3 ends, and the print process is performed after the printer application is reactivated.

As shown in FIG. 6, in Case C, after the submit process of FIG. 3 ends, the user of the portable terminal 70 performs an operation of terminating the printer application. In accordance with this, the CPU 82 terminates the printer application. After that, the user of the portable terminal 70 reactivates the printer application. At this point in time, the RT (see FIG. 2) received from the print intermediation server 100 in the registration process is stored in the memory 84. Due to this, when the printer application is activated, the CPU 82 sends an AT request 260 including the RT to the print intermediation server 100 via the wireless LAN I/F 78.

Upon receiving the AT request 260 from the portable terminal 70, the print intermediation server 100 executes authentication of the RT included in the AT request 260. When the authentication of the RT is successful, the print intermediation server 100 creates an AT 261 which is a token different from the AT 221 associated with the successfully authenticated RT. Subsequently, the print intermediation server 100 stores the successfully authenticated RT, the created AT 261, and the respective items of information (that is, the account information, the printer ID, the virtual print condition information, the first job information 240, and the second job information 250) associated with the RT in association. In this case, the print intermediation server 100 stores the created AT 261 instead of the stored AT 221. The print intermediation server 100 sends a response 262 including the created AT 261 to the portable terminal 70.

Upon receiving the response 262 from the print intermediation server 100 via the wireless LAN I/F 78, the CPU 82 stores the AT 261 included in the response 262 in the memory 84 instead of the AT 221. According to the present embodiment, the portable terminal 70 can receive the new AT 261 from the print intermediation server 100 by activating the printer application.

The processes performed by the CPU 82, the CPU 32, and the print intermediation server 100 are the same as those of Case A except that the AT 261 is used instead of the AT 221. Specifically, the difference from Case A is that the job list request 304 that the CPU 82 sends to the print intermediation server 100, the print request 306 that the CPU 82 sends to the printer 10, and the job list request 308 and the print data request 310 that the CPU 32 sends to the print intermediation server 100 include the AT 261. Thus, detailed description of these processes will not be provided.

As described above, in Case C, the portable terminal 70 receives the AT 261 that is different from the AT 221 when the printer application is activated and sends the print request 306 including the AT 261 to the printer 10. Thus, the portable terminal 70 can send the print request 306 appropriately to the printer 10 before the remaining expiration time of the AT 261 becomes insufficient.

Advantages of First Embodiment

As described above, in the present embodiment, the portable terminal 70 sends the AT requests 220 and 260 (see FIGS. 3 and 6) including the received RT in response to activation of the printer application in a state where the RT is stored in the memory 84 and receives the AT from the print intermediation server 100. After the AT 221 is received from the print intermediation server 100, the portable terminal 70 sends the submit request 230 including the received AT 221 and the image data 232 to the print intermediation server 100 (see FIG. 3). Moreover, after the ATs 221 and 261 are received from the print intermediation server 100, the portable terminal 70 sends the print requests 280 and 306 including the received ATs 221 and 261 to the printer 10 (see FIGS. 4 and 6). When a printer application is activated, a submit process and a print process are highly likely to be performed successively in a relatively short period. In the present embodiment, since the portable terminal 70 receives the ATs 221 and 261 in response to activation of the printer application, the ATs 221 and 261 of which the remaining expiration time is sufficient are stored in the memory 84 after the printer application is activated. Due to this, the portable terminal 70 can send the submit request 230 to the print intermediation server 100 before the remaining expiration time of the AT 221 becomes insufficient. Similarly, the portable terminal 70 can send the print requests 280 and 306 to the printer 10 before the remaining expiration time of the ATs 221 and 261 becomes insufficient. That is, in the present embodiment, the portable terminal 70 can perform the submit process and the print process appropriately using the AT of which the remaining expiration time is sufficient. Thus, the portable terminal 70 can cause the printer 10 to perform printing appropriately using the print intermediation server 100.

The submit request 230 and the print requests 280, 300, and 306 do not include the RT. Due to this, it is possible to decrease the data size of the submit request 230 and the print requests 280, 300, and 306 and to reduce a communication load of the portable terminal 70.

(Correspondence)

The portable terminal 70 is an example of a "terminal device". The RT and AT are examples of a "specific key" and an "authentication key". The printer application activation operation of FIGS. 2 and 6, the submit operation of FIG. 3, the job ID selection operation of FIGS. 4 to 6, and the print operation (see FIGS. 4 to 6) are examples of a "print related instruction," a "first instruction," and a "second instruction," respectively. The image data 232 of FIG. 3 is an example of "image data related information". The submit request 230 of FIG. 3 and the print requests 280, 300, and 306 of FIGS. 4 to 6 are examples of a "first request" and a "second request," respectively. The AT 221 is an example of a "first item of authentication key". The ATs 221, 276, and 261 are examples of a "second item of authentication key". The normal Wi-Fi scheme and the NFC scheme are examples of a "first communication scheme" and a "second communication scheme," respectively.

The process of receiving the RT included in the login success notification 216 in FIG. 2 is an example of "receiving a specific key from a print intermediation server". The process of sending the AT request 220 including the RT in FIG. 3 and the process of sending the AT request 260 including the RT in FIG. 6 are examples of "sending the received specific key to the print intermediation server". The process of receiving the AT 218 included in the response 219 in FIG. 2, the process of receiving the AT 221 included in the response 222 in FIG. 3, the process of receiving the AT 276 included in the response 278 in FIG. 5, and the process of receiving the AT 261 included in the response 262 in FIG. 6 are examples of "receiving the authentication key from the print intermediation server". The process of sending the submit request 230 in FIG. 3 is an example of "sending, . . . , a first request to the print intermediation server". The process of sending the print request 280 in FIG. 4, the process of sending the print request 300 in FIG. 5, and the process of sending the print request 306 in FIG. 6 are examples of a process performed by "sending, . . . , a second request to the printer".

Second Embodiment

FIG. 7

In the first embodiment, the registration process which uses the OAuth method is performed (see FIG. 2). In the present embodiment, the registration process which uses the Client Login method is performed. The present embodiment is different from the first embodiment in that the RT and the AT 319 are sent earlier than the registration request 332.

As shown in FIG. 7, when the printer application is activated, the CPU 82 starts a registration process. First, the CPU 82 displays a login screen on the display unit 74. The user inputs account information to the portable terminal 70 using the operation unit 72. In this case, the CPU 82 sends the login request 314 including the input account information to the print intermediation server 100 via the wireless LAN I/F 78.

Upon receiving the login request 314 from the portable terminal 70, the print intermediation server 100 executes authentication of the account information included in the login request 314 and generates an RT when the authentication of the account information is successful. Subsequently, the print intermediation server 100 stores the successfully authenticated account information in association with the RT. The print intermediation server 100 sends a login success notification 316 including the created RT to the portable terminal 70.

Upon receiving the login success notification 316 from the print intermediation server 100 via the wireless LAN I/F 78, the CPU 82 stores the RT included in the login success notification 316 in the memory 84. Subsequently, the CPU 82 sends an AT request 318 including the RT stored in the memory 84 to the print intermediation server 100 via the wireless LAN I/F 78.

Upon receiving the AT request 318 from the portable terminal 70, the print intermediation server 100 executes authentication of the RT included in the AT request 318. When the authentication of the RT is successful, the print intermediation server 100 creates an AT 319. The print intermediation server 100 stores the created AT 319 in association with the successfully authenticated RT. As a result, in the print intermediation server 100, the successfully authenticated RT is associated with the AT 319. The print intermediation server 100 sends a response 320 including the created AT 319 to the portable terminal 70.

Upon receiving the response 320 from the print intermediation server 100, the CPU 82 stores the AT 319 included in the response 320 in the memory 84. Subsequently, the CPU 82 sends a registration request 322 including virtual print condition information and a proxy ID to the print intermediation server 100 via the wireless LAN I/F 78.

Upon receiving the registration request 322 from the portable terminal 70, the print intermediation server 100 creates a printer ID using the proxy ID included in the registration request 322. The print intermediation server 100 stores the created printer ID and the virtual print condition information. As a result, in the print intermediation server 100, the created printer ID, the account information, the virtual print condition information, the RT, and the AT 319 are associated with each other. The print intermediation server 100 sends a registration success notification 324 including the created printer ID to the portable terminal 70.

Upon receiving the registration success notification 324 from the print intermediation server 100 via the wireless LAN I/F 78, the CPU 82 stores the printer ID included in the registration success notification 324 in the memory 84. In accordance with this, the registration process ends. The submit process and the print process are the same as those of the first embodiment.

In the present embodiment, the portable terminal 70 also can register the virtual print condition information, the printer ID, and the like in the print intermediation server 100 similarly to the first embodiment. In the portable terminal 70, the process of receiving the RT included in the login success notification 316 in FIG. 7 is an example of "receiving a specific key from a print intermediation server".

While specific embodiments of the present invention have been described in detail, these embodiments are examples only and do not limit the claims. The techniques disclosed in the claims may include various modifications and alterations of the specific embodiments. Modifications of the embodiments will be described below.

Modification 1

In the embodiments described above, the expiration time of the RT is not set. Instead of this, an expiration time that is longer than that of the AT may be set to the RT. In this modification, the RT is also an example of a "specific key".

Modification 2

In the embodiments described above, as shown in FIGS. 3 and 6, the portable terminal 70 sends the AT requests 220 and 260 including the RT to the print intermediation server 100 whenever the printer application is activated after the RT is stored in the memory 84. Instead of this, the portable terminal 70 may send the AT request including the RT to the print intermediation server 100 in response to another optional operation (for example, a submit instruction operation, a print operation, and establishment of NFC communication with the printer 10) after the RT is stored in the memory 84. In this modification, the optional operation is also an example of a "print related instruction".

Modification 3

The portable terminal 70 may not send the AT requests 220 and 260 including the RT to the print intermediation server 100 whenever the printer application is activated after the RT is stored in the memory 84. That is, for example, the portable terminal 70 may send the AT requests 220 and 260 including the RT to the print intermediation server 100 when a predetermined operation is performed after the RT is stored in the memory 84 and the printer application is activated. Generally, the computer-readable instructions, when executed by the processor, may cause the terminal device to perform sending the received specific key to the print intermediation server in response to the terminal device accepting a print related instruction relating to printing in a printer after the specific key is received.

Modification 4

In the embodiments described above, the portable terminal 70 terminates the printer application in accordance with the operation of the user after the registration process of FIG. 2 ends. Further, the printer application is reactivated before the submit process of FIG. 3 is performed. Instead of this, the portable terminal 70 may perform the submit process of FIG. 3 while putting the printer application in the activated state continuously without terminating the printer application after the registration process of FIG. 2 ends. In this case, the portable terminal 70 may perform the respective processes using the AT 218 (see FIG. 2) instead of the AT 221 in the submit process.

Modification 5

Moreover, the portable terminal 70 may terminate the printer application forcibly independently from the operation of the user after the registration process of FIG. 2 and the submit process of FIG. 3 end. In this case, the portable terminal 70 can receive the AT from the print intermediation server 100 when the printer application is activated subsequently. Due to this, in this modification, the portable terminal 70 does not need receive the AT 218 from the print intermediation server 100 in the registration process of FIG. 2.

Modification 6

In the embodiments described above, in Case B of FIG. 5, the portable terminal 70 sends the AT request 274 to the print intermediation server 100 in response to arrival of the predetermined timing before the print operation is performed after the job selection screen is displayed. Instead of this, the portable terminal 70 may send the AT request to the print intermediation server 100 regardless of whether the print operation is performed when the predetermined timing arrives as long as the printer application has been activated. For example, in the submit process of FIG. 3, the portable terminal 70 may send the AT request to the print intermediation server 100 even when the predetermined timing arrives before the submit operation is performed after the printer application is activated.

Modification 7

In the embodiments described above, in the print process of FIG. 4 to 6, the portable terminal 70 displays the job selection screen in accordance with the list display operation of the user and sends the print requests 280, 300, and 306 including the first job ID selected by the user to the printer 10. Moreover, the printer 10 receives the print data 296 corresponding to the first job information 240 indicated by the first job ID. Instead of this, when the print request is sent from the portable terminal 70 to the printer 10, the print intermediation server 100 may send items of print data corresponding to all job IDs in the job list 292 sequentially to the printer 10. That is, in this modification, the portable terminal 70 may not need to display the job selection screen. In this case, the user of the portable terminal 70 may carry the portable terminal 70 closer to the printer 10 after the portable terminal 70 performs the print operation. When establishing NFC communication with the printer 10, the portable terminal 70 may send the print request including the AT and the printer ID only to the printer 10. The print intermediation server may create a plurality of items of print data corresponding to a plurality of items of job information associated with the received AT sequentially and supply the same to the printer 10. In this case, the printer 10 may receive the plurality of items of print data sequentially and print images represented by the respective items of print data sequentially.

Modification 8

In the embodiments described above, in the registration process of FIG. 2, the portable terminal 70 sends the registration request 200 including the virtual print condition information to the print intermediation server 100. Instead of this, for example, when the virtual print condition information is stored in a data server (that is, a server provided by the vendor of the printer 10) on the Internet, the portable terminal 70 may send the registration request including the URL of the virtual print condition information to the print intermediation server 100. In this case, the print intermediation server 100 may acquire the virtual print condition information from the data server using the URL of the virtual print condition information and store the acquired virtual print condition information. Moreover, in a case where the print intermediation server 100 is a server provided by the vendor of the printer 10, the print intermediation server 100 may have the virtual print condition information stored in advance. In this case, the portable terminal 70 may a registration request that does not include the virtual print condition information and the URL of the virtual print condition information to the print intermediation server 100.

Modification 9

In the embodiments described above, in the submit process of FIG. 3, the portable terminal 70 sends the submit request 230 including the image data 232 to the print intermediation server 100. Instead of this, for example, when the image data 232 is stored in a data server on the Internet, the portable terminal 70 may send a submit request including the URL of the image data 232 to the print intermediation server 100. In this case, the print intermediation server 100 stores the first job information 240 including the URL of the image data 232. Moreover, in the print process of FIGS. 4 to 6, upon receiving the print data request 294 from the printer 10, the print intermediation server 100 may acquire the image data 232 from the data server using the URL of the image data 232, convert the acquired image data 232, and create the print data 296. In this modification, the URL of the image data 232 is an example of "image data related information".

Modification 10

In the embodiments described above, in the print process of FIGS. 4 to 6, the portable terminal 70 sends the encrypted data created by encrypting the printer ID and the first AT to the printer 10. Instead of this, the portable terminal 70 may send the printer ID and the first AT to the printer 10 without encrypting the same. Generally, "the sending of the second request" may include sending authentication information to a real printer.

Modification 11

The printer 10 and the portable terminal 70 may perform a near field wireless communication (for example, transfer-jet or infrared wireless communication) of another communication scheme rather than performing the wireless communication of the NFC scheme to communicate the encrypted data. In this modification, the other scheme is an example of a "second communication scheme". Generally, the sending of the second request may be performed in accordance with a second communication scheme, a communication speed of the second communication scheme being slower than a communication speed of the first communication scheme.

Modification 12

The portable terminal 70 may perform wireless communication of a cellular scheme such as 3G or 4G to communicate with the print intermediation server 100 rather than performing wireless communication of the normal Wi-Fi scheme to communicate various items of information (for example, the registration request 200 of FIG. 2) with the print intermediation server 100. Moreover, when the portable terminal 70 is connected to the Internet via cables, the portable terminal 70 may perform wired communication to communicate with the print intermediation server 100. In this modification, the cellular scheme or the wired scheme is an example of a "first communication scheme".

Modification 13

The print intermediation server 100 may not be one server and may be a plurality of separate servers. For example, the print intermediation server 100 may include a first server that performs respective processes shown in the registration process of FIG. 2 and a second server (a second server separated from the first server) that performs respective processes shown in the respective processes of FIG. 3 and subsequent diagrams.

Modification 14

The "terminal device" may not be the portable terminal 70 but may be a stationary PC or another device (for example, a television).

Modification 15

In the embodiments described above, the CPU 32 and the CPU 82 execute the program (for example, the printer application) in the memories 34 and 84, whereby the respective processes of FIGS. 2 to 7 are realized. Instead of this, at least one process of the respective processes of FIGS. 2 to 7 may be realized by hardware such as a logical circuit.

What is claimed is:

1. A non-transitory computer-readable medium storing computer-readable instructions for a terminal device, the instructions comprising:
    a plurality of instructions executable by a processor of the terminal device that, when executed by the processor, cause the terminal device to perform:
    receiving a specific key from a print intermediation server, the specific key being for receiving, from the print intermediation server, an authentication key to which an expiration time is set;
    sending the received specific key to the print intermediation server in response to the terminal device accepting a print related instruction relating to printing in a printer after the specific key is received;
    receiving the authentication key from the print intermediation server in response to sending the specific key, the authentication key being created by the print intermediation server each time the print intermediation server receives the specific key from the terminal device, the specific key and the authentication key being associated in the print intermediation server;
    sending a first request to the print intermediation server after a first item of the authentication key is received from the print intermediation server, the first request including the received first item of the authentication key and image data related information relating to target image data representing a target image of a print target, the first request being for causing the print intermediation server to associate the image data related information and the specific key which is associated with the first item of the authentication key; and
    sending a second request to the printer after a second item of the authentication key is received from the print intermediation server, the second request including the received second item of the authentication key, the second request being for causing the printer to execute receiving of target print data using the second item of the authentication key, the target print data being created from the target image data by the print intermediation server.

2. The non-transitory computer readable medium as in claim 1, wherein
    each of the first request and the second request does not include the specific key.

3. The non-transitory computer readable medium as in claim 1, wherein
    the print related instruction is for activating an application, the application being for causing the printer to perform printing using the print intermediation server.

4. The non-transitory computer readable medium as in claim 3,
    wherein
    the sending of the first request is performed in a case where the terminal device accepts a first instruction after the first item of the authentication key is received as a result of the activation of the application and before the application is terminated, and
    the sending of the second request, which includes the second item of the authentication key being the same as the first item of the authentication key, is performed in a case where the terminal device accepts a second instruction being different from the first instruction after the first request is sent to the print intermediation server and before the application is terminated.

5. The non-transitory computer readable medium as in claim 4,
    wherein
    the sending of the second request, which includes the second item of the authentication key being the same as the first item of the authentication key, is performed in a case where the terminal device accepts the second instruction before a predetermined timing arrives, the predetermined timing being decided based on the expiration time being set to the first item of the authentication key,
    the sending of the specific key is performed in a case where the predetermined timing arrives,
    the receiving of the second item of the authentication key, which is different from the first item of the authentication key, is performed in response to sending the specific key in the case where the predetermined timing arrives, and
    the sending of the second request, which includes the second item of the authentication key being different from the first item of the authentication key, is performed in a case where the terminal device accepts the second instruction after the predetermined timing arrives.

6. The non-transitory computer readable medium as in claim 3,
    wherein
    the receiving of the second item of the authentication key, which is different from the first item of the authentication key, is performed, in a case where the application is terminated and then the application is re-activated, after the first request is sent to the print intermediation server, and the sending of the second request, which includes the second item of the authentication key being different from the first item of the authentication key, is performed after the second item of the authentication key being different from the first item of the authentication key is received.

7. The non-transitory computer readable medium as in claim 1, wherein
the receiving of the specific key is performed in accordance with a first communication scheme,
the sending of the specific key is performed in accordance with the first communication scheme,
the receiving of the authentication key is performed in accordance with the first communication scheme,
the sending of the first request is performed in accordance with the first communication scheme, and
the sending of the second request is performed in accordance with a second communication scheme, a communication speed of the second communication scheme being slower than a communication speed of the first communication scheme.

8. The non-transitory computer readable medium as in claim 7, wherein
the second communication scheme is a NFC (Near Field Communication) scheme.

9. The non-transitory computer readable medium as in claim 1, wherein
the receiving of the specific key is performed via the Internet,
the sending of the specific key is performed via the Internet,
the receiving of the authentication key is performed via the Internet, and
the sending of the first request is performed via the Internet.

10. A terminal device comprising:
a processor; and
a memory storing computer-readable instructions therein, the computer-readable instructions, when executed by the processor, causing the terminal device to perform:
receiving a specific key from a print intermediation server, the specific key being for receiving, from the print intermediation server, an authentication key to which an expiration time is set;
sending the received specific key to the print intermediation server in response to the terminal device accepting a print related instruction relating to printing in a printer after the specific key is received;
receiving the authentication key from the print intermediation server in response to sending the specific key, the authentication key being created by the print intermediation server each time the print intermediation server receives the specific key from the terminal device, the specific key and the authentication key being associated in the print intermediation server;
sending a first request to the print intermediation server after a first item of the authentication key is received from the print intermediation server, the first request including the received first item of the authentication key and image data related information relating to target image data representing a target image of a print target, the first request being for causing the print intermediation server to associate the image data related information and the specific key which is associated with the first item of the authentication key; and
sending a second request to the printer after a second item of the authentication key is received from the print intermediation server, the second request including the received second item of the authentication key, the second request being for causing the printer to execute receiving of target print data using the second item of the authentication key, the target print data being created from the target image data by the print intermediation server.

11. A method comprising:
executing instructions, by a processor of a terminal device, the execution of the instructions by the processor causing the terminal device to perform:
receiving a specific key from a print intermediation server, the specific key being for receiving, from the print intermediation server, an authentication key to which an expiration time is set;
sending the received specific key to the print intermediation server in response to the terminal device accepting a print related instruction relating to printing in a printer after the specific key is received;
receiving the authentication key from the print intermediation server in response to sending the specific key, the authentication key being created by the print intermediation server each time the print intermediation server receives the specific key from the terminal device, the specific key and the authentication key being associated in the print intermediation server;
sending a first request to the print intermediation server after a first item of the authentication key is received from the print intermediation server, the first request including the received first item of the authentication key and image data related information relating to target image data representing a target image of a print target, the first request being for causing the print intermediation server to associate the image data related information and the specific key which is associated with the first item of the authentication key; and
sending a second request to the printer after a second item of the authentication key is received from the print intermediation server, the second request including the received second item of the authentication key, the second request being for causing the printer to execute receiving of target print data using the second item of the authentication key, the target print data being created from the target image data by the print intermediation server.

* * * * *